United States Patent [19]
Barthel et al.

[11] Patent Number: 5,269,124
[45] Date of Patent: Dec. 14, 1993

[54] CROP CONDITIONER

[75] Inventors: Ronald Barthel, Berthelsdorf; Karl-Heinz Kretschmer, Neustadt; Martin Schubert, Bischofswerda; Volker Hänel, Neustadt, all of Fed. Rep. of Germany

[73] Assignee: Fortschritt Erntemaschinen GmbH, Neustadt, Fed. Rep. of Germany

[21] Appl. No.: 979,526

[22] Filed: Nov. 23, 1992

[30] Foreign Application Priority Data

Nov. 22, 1991 [DE] Fed. Rep. of Germany ....... 4139221

[51] Int. Cl.$^5$ .................. A01D 43/10; A01D 82/00
[52] U.S. Cl. .................. 56/16.4; 56/DIG. 1
[58] Field of Search .................. 56/1, 16.4 R, DIG. 1

[56] References Cited

U.S. PATENT DOCUMENTS

| | | | |
|---|---|---|---|
| 2,723,669 | 11/1955 | Pool et al. | 56/DIG. 1 |
| 3,472,003 | 10/1969 | Case | 56/DIG. 1 |
| 4,445,313 | 5/1984 | Elliott et al. | 56/DIG. 1 X |
| 4,896,483 | 1/1990 | O'Halloran et al. | 56/DIG. 1 |

FOREIGN PATENT DOCUMENTS

| | | |
|---|---|---|
| 83484 | 12/1972 | Fed. Rep. of Germany . |
| 151551 | 2/1982 | Fed. Rep. of Germany . |
| 3331319 | 3/1984 | Fed. Rep. of Germany . |
| 2923597 | 7/1988 | Fed. Rep. of Germany . |
| 3711047 | 10/1988 | Fed. Rep. of Germany . |
| 2917191 | 6/1989 | Fed. Rep. of Germany . |
| 3939618 | 6/1991 | Fed. Rep. of Germany . |
| 3939659 | 6/1991 | Fed. Rep. of Germany . |
| 3923637 | 6/1992 | Fed. Rep. of Germany . |
| 2568091 | 1/1986 | France . |
| 90/12492 | 3/1990 | World Int. Prop. O. . |

*Primary Examiner*—David J. Bagnell
*Attorney, Agent, or Firm*—Herbert Dubno; Andrew Wilford

[57] ABSTRACT

A crop conditioner has a frame adapted to travel along the ground, an upstream pair of vertically spaced ribbed rollers to which is supplied a stream of crop to be conditioned, and a downstream pair of ribbed rollers downstream of the upstream pair. A drive counterrotates the upstream rollers at a predetermined speed and thereby takes in the crop stream, conditions it, and puts it out toward the downstream rollers. A drive also counterrotates the downstream rollers at a predetermined speed which is different from the predetermined speed of the upstream rollers and thereby takes in the crop stream from the upstream pair, conditions it, and outputs it, normally laying it back on the ground.

12 Claims, 2 Drawing Sheets

CROP CONDITIONER

FIELD OF THE INVENTION

The present invention relates to a crop conditioner. More particularly this invention concerns such an apparatus which can be part of a combine or a separate device.

BACKGROUND OF THE INVENTION

A crop conditioner can be provided directly on a crop cutter such as a combine or can be a separate machine that is pulled along behind a cutter or that is simply moved around the field to pick up crop, condition it, and redeposit it on the ground so it can cure. The main function of such a device is to partially crush the crop, thereby breaking stems and making them dry out more quickly. As a rule such devices have at their heart a pair of ribbed rollers that rotate in opposite direction, like a laundry extractor, to pinch the crop and crease the stems where the roller ribs fall.

Various systems described in East German patent 83,484 of H. Schumacher, German patent 2,923,597 of A. Werner, German patent documents 3,331,319 of R. Bellon and 3,711,047 of W. Schulz, French patent 2,568,091 of M. Pruitt (based on US application 06/633,933 use such ribbed rollers. All have the disadvantage that they are only usable on a limited range of crop types. When a thick mat of crop is being conditioned, only the stems lying on the outer surfaces are creased, the inner material being left substantially unconditioned.

It has accordingly been suggested in East German patent 151,551 of T. Eistert to rotate one of the pinch rollers at a speed that is different from that of the other pinch roller. This achieves a slightly better effect, but still leaves the core of the mat being conditioned largely untouched.

In U.S. Pat. No. 4,445,313 of T. ELliot two sets of ribbed pinch rollers are used. The peripheral speeds of both sets of rollers are identical, but their relative angular positions are such that the ribs of the downstream pair fall between the creases created by the upstream pair, thereby crushing the stems at a new location. Once again, conditioning is improved slightly by this system, but not substantially.

Numerous other systems have been proposed in German patent documents 3,923,637, 3,939,618, and 3,939,659, all of K. Schmittbetz as well as in German patent 2,917,191 of G. Krutz (based on U.S. application 06/901,067) and PCT application PCT/EP90/00487 of W. VonAllworden to improve conditioning efficiency. In them the crop is taken in, conditioned, and laid as a mat between 6 mm and 10 mm thick in the field behind the machine. While such machines reduce drying time for the crop considerably, the crop could in theory be conditioned more thoroughly without damage.

OBJECTS OF THE INVENTION

It is therefore an object of the present invention to provide an improved crop conditioner.

Another object is the provision of such an improved crop conditioner which overcomes the above-given disadvantages, that is which thoroughly conditions the crop passing through it.

A further object is to provide such a machine that can be adapted for use with fragile crops and thick-stemmed crops.

SUMMARY OF THE INVENTION

A crop conditioner has according to the invention a frame adapted to travel along the ground, an upstream pair of vertically spaced ribbed rollers to which is supplied a stream of crop to be conditioned, and a downstream pair of ribbed rollers downstream of the upstream pair. A drive counterrotates the upstream rollers at a predetermined speed and thereby takes in the crop stream, conditions it, and puts it out toward the downsteam rollers. A drive also counterrotates the downstream rollers at a predetermined speed which is different from the predetermined speed of the upstream rollers and thereby takes in the crop stream from the upstream pair, conditions it, and outputs it, normally laying it back on the ground.

The different operational speeds of the two pairs of rollers enormously increases the conditioning efficiency. When the downstream rollers are rotating more rapidly, the crop stream is longitudinally stretched so that even the material in the middle of the stream is exposed and conditioned. This action will also make the downstream rollers tear apart longer stems which will be simultaneously engaged in both roller pairs. When the downstream rollers are rotating more slowly, stems are jammed up and crimped as they arrive from the faster upstream rollers, thereby making the device work very efficiently with thick-stemmed crops by breaking their long fibers.

According to the invention, one of the roller-rotation speeds is at least about twice the other roller-rotation speed. Either the upstream roller-rotation speed is faster than the downstream roller-rotation speed or the downstream roller-rotation speed is faster than the upstream roller-rotation speed. In addition the upstream- and downstream-roller drives rotate the respective rollers at the same peripheral speed.

In accordance with further features of the invention one of the upstream rollers and one of the downstream rollers is rotatable in the frame about a respective axis fixed in the frame. The conditioner further has according to the invention respective upstream and downstream mounts carrying the other upstream and downstream rollers for movement toward and away from the respective one rollers so that the one roller of each pair is a relatively fixed roller and the other roller of each pair is a relatively movable roller. The mounts include respective arms pivoted on the frame and having outer ends rotatably supporting the respective movable rollers. One of the movable rollers is below the respective fixed roller and the other of the movable rollers is above the respective fixed roller. Furthermore a latch is provided for arresting the movable roller of the downstream pair in a locked-out position spaced sufficiently from the fixed roller of the downstream pair that the crop stream passing between the downstream rollers is not significantly compressed by the downstream rollers. In this locked-out position the system operates like a conventional two-roller conditioner that is used with leafy crops like clover or alfalfa.

Respective spring biasing units urge each of the movable rollers toward the respective fixed roller. Each such unit includes a cable spanned through the frame and having one end section attached to one end of the respective movable roller and another end section attached to the other end of the respective movable roller, and a tension spring between the respective cable sections for pulling same together and thereby pulling the respective movable roller toward the respective fixed roller.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
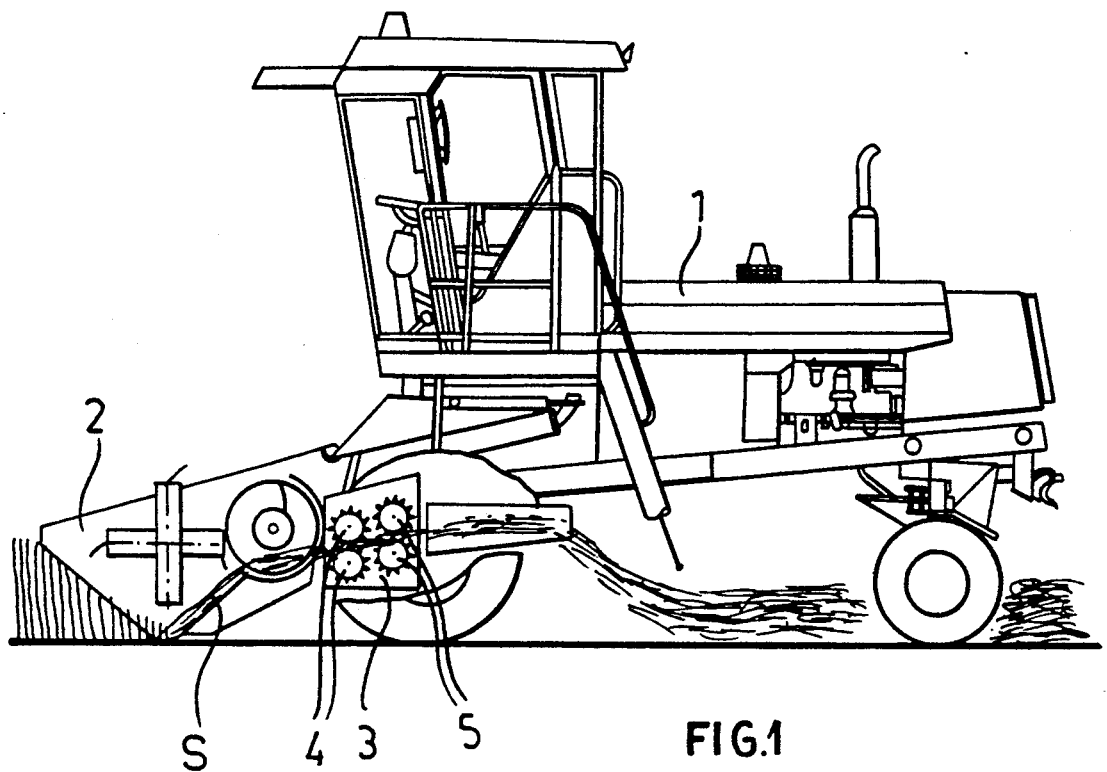
FIG. 1 is a small-scale side view of a crop harvester incorporating the conditioner according to this invention.
Figure 2:
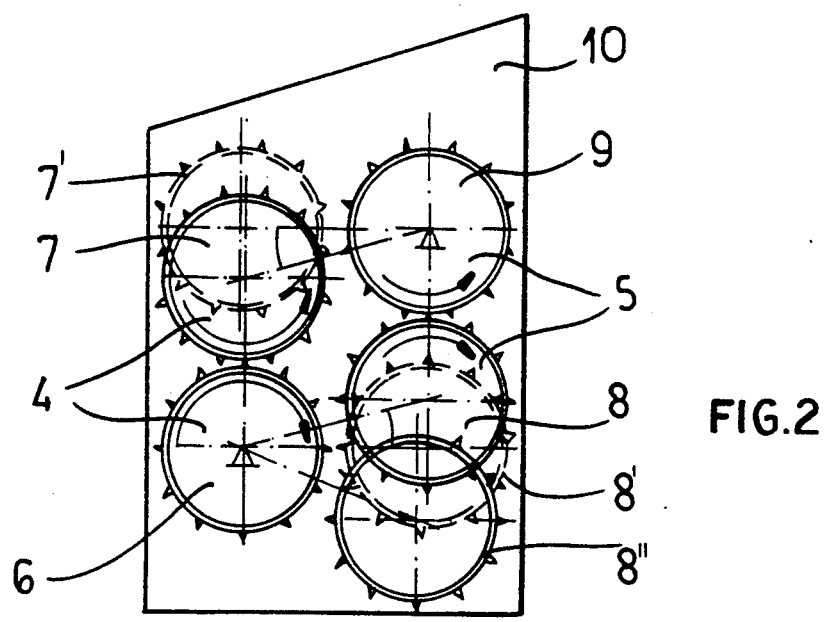
FIG. 2 is a schematic vertical section through the conditioner.
Figure 3:
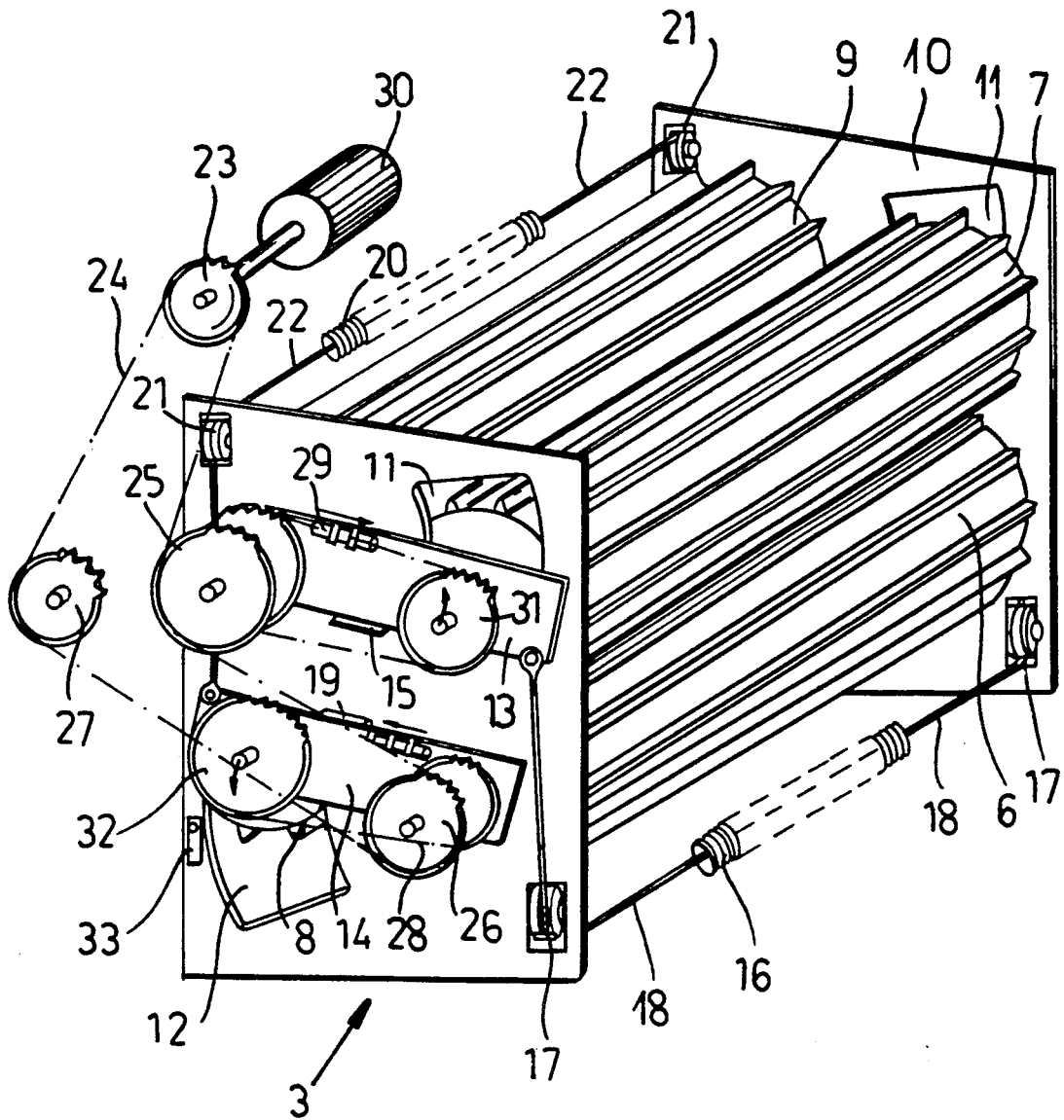
FIG. 3 is a partly diagrammatic perspective end view of the conditioner.

As seen in FIG. 1 a combine harvester 1 has a front-end crop cutter 2 that passes a stream S of crop back up through a conditioner 3 comprising an upstream pinch-roller pair 4 and a downstream pinch-roller pair 5. FIG. 2 shows how the upstream pair 4 comprises a ribbed lower roller 6 and a ribbed upper roller 7 rotatable about respective parallel axes extending horizontally perpendicular to the normal direction of displacement of the combine 1 and of the crop stream S. The downstream pair 5 is constituted by similar ribbed lower and upper rollers 8 and 9 rotatable like the rollers 6 and 7 about axes parallel to the rotation axes of the rollers 6 and 7.

The lower upstream roller 6 and upper downstream roller 9 are journaled directly in a housing 10 of the conditioner 3 so that their rotation axes are fixed relative to this housing 10. The rollers 7 and 8, however, have ends that project through respective windows 11 and 12 of the housing 10 and that are journaled in the free outer ends of respective arms 13 and 14 pivoted on the housing 10 so that these rollers 7 and 8 can move during normal operation outward from the respective rollers 6 and 9 into the positions shown at 7' and 8' in FIG. 2. In addition the downstream movable roller 8 can be moved into the extreme outer position shown at 8" in FIG. 2 to take it and the entire downstream pair 5 out of service, as is necessary when conditioning very fragile crops. A latch dog 33 can retain each such arm 14 in this lowered locked-out position. Abutments 15 and 19 are provided to define for the arms 13 and 14 the innermost positions of the respective rollers 7 and 8.

The outer ends of the arms 13 are secured to cables 18 spanned over deflecting rollers 17 and connected together by a tension spring 16 to urge the roller 7 into the innermost position, resting on the abutments 15. Similarly the outer ends of the arm 14 are secured to cables 22 spanned over deflecting rollers 21 and connected together by a tension spring 20 to urge the roller 8 into the innermost position, resting on the abutments 19.

A single drive motor 30, or a power takeoff from the combine 1, rotates a main drive sprocket 23 that drives a single endless chain 24 to drive all the rollers 6 through 9. To this end the chain is spanned over one wheel of a double sprocket 25 on the roller 9 and over one wheel of another double sprocket 26 provided on the roller 6 to rotate both rollers in the same direction, and also over a tightening sprocket 27. The other wheel of the sprocket 25 is connected via a chain 29 to a sprocket 31 carried on the roller 7 and the other wheel of the sprocket 27 is connected via a chain 28 to a sprocket 32 carried on the roller 8. Thus all of the rollers 7 through 9 will be rotated synchronously with the upper rollers 7 and 9 rotating oppositely to the respective lower rollers 6 and 8.

Furthermore according to the invention the sizes of the sprockets 25, 26, 1, and 32 are such that the upstream rollers 6 and 7 rotate at the same peripheral speed, but this speed is different from the peripheral speed of the downstream rollers 8 and 9, which nonetheless rotate at the same peripheral speed as each other. For fairly light and long-stemmed crop, the downstream speed is set to be twice the upstream speed, thereby pulling apart and crushing the stream S. When the crop is heavier an the stems are very thick, the relationship is reversed with the upstream rollers rotating faster than the downstream rollers so as to push the thicker stems into the downstream rollers and crush them longitudinally as well as transversely.

I claim:

1. A crop conditioner comprising:
   a frame adapted to travel along the ground;
   an upstream pair of vertically spaced ribbed rollers;
   means for supplying a stream of crop to be conditioned to the upstream rollers;
   a downstream pair of ribbed rollers downstream of the upstream pair;
   means for counterrotating the upstream rollers at a predetermined speed and thereby taking in the crop stream, conditioning it, and putting it out toward the downsteam rollers; and
   means for counterrotating the downstream rollers at a predetermined speed which is different from the predetermined speed of the upstream rollers and thereby taking in the crop stream from the upstream pair, conditioning it, and putting it out.

2. The crop conditioner defined in claim 1 wherein one of the roller-rotation speeds is at least about twice the other roller-rotation speed.

3. The crop conditioner defined in claim 1 wherein the upstream roller-rotation speed is faster than the downstream roller-rotation speed.

4. The crop conditioner defined in claim 1 wherein the downstream roller-rotation speed is faster than the upstream roller-rotation speed.

5. The crop conditioner defined in claim 1 wherein the upstream-roller drive means rotates the upstream rollers at the same peripheral speed.

6. The crop conditioner defined in claim 1 wherien the downstream-roller drive means rotates the downstream rollers at the same peripheral speed.

7. The crop conditioner defined in claim 1 wherein one of the upstream rollers and one of the downstream rollers is rotatable in the frame about a respective axis fixed in the frame, the conditioner further comprising
   respective upstream and downstream mounting means carrying the other upstream and downstream rollers for movement toward and away from the respective one rollers, whereby the one roller of each pair is a relatively fixed roller and the other roller of each pair is a relatively movable roller.

8. The crop conditioner defined in claim 7 wherein the mounting means include respective arms pivoted on the frame and having outer ends rotatably supporting the respective movable rollers.

9. The crop conditioner defined in claim 8 wherein one of the movable rollers is below the respective fixed roller and the other of the movable rollers is above the respective fixed roller.

10. The crop conditioner defined in claim 7, further comprising
    means for arresting the movable roller of the downstream pair in a position spaced sufficiently from the fixed roller of the downstream pair that the crop stream passing between the downstream rollers is not significantly compressed by the downstream rollers.

11. The crop conditioner defined in claim 7, further comprising
    respective spring means urging each of the movable rollers toward the respective fixed roller.

12. The crop conditioner defined in claim 11 wherein each spring means includes:
    a cable spanned through the frame and having one end section attached to one end of the respective movable roller and another end section attached to the other end of the respective movable roller; and
    a tension spring between the respective cable sections for pulling same together and thereby pulling the respective movable roller toward the respective fixed roller.

* * * * *